United States Patent [19]

Roslonski

[11] Patent Number: 4,655,932

[45] Date of Patent: Apr. 7, 1987

[54] METHOD AND APPARATUS FOR THE DISINTEGRATION AND DESTRUCTION OF HAZARDOUS AND TOXIC SLUDGE MATERIALS

[76] Inventor: Don Roslonski, 38 Fairview Ave., Brick Town, N.J. 08723

[21] Appl. No.: 827,417

[22] Filed: Feb. 10, 1986

[51] Int. Cl.[4] .............................................. C02F 1/48
[52] U.S. Cl. .................................... 210/709; 210/732; 210/746; 210/748; 210/751; 210/196; 210/760; 210/764; 210/143; 210/177; 210/199; 210/206; 210/243; 110/219; 110/224; 110/250; 204/152; 204/165; 204/305; 219/383
[58] Field of Search ............... 204/149, 152, 165, 186, 204/305; 219/383, 384; 210/709, 732, 738, 746, 748, 751, 758, 760, 764, 96.1, 143, 177, 180, 182, 199, 206, 243; 110/218–221, 224, 228, 250

[56] References Cited

U.S. PATENT DOCUMENTS

| | | | |
|---|---|---|---|
| 3,846,300 | 11/1974 | Inoue | 210/748 |
| 4,101,400 | 7/1978 | Pepping | 210/748 |
| 4,441,437 | 4/1984 | Moskau | 210/751 |
| 4,499,832 | 2/1985 | McNeil | 110/250 |
| 4,574,714 | 3/1986 | Bach | 110/250 |

*Primary Examiner*—Ernest G. Therkorn
*Attorney, Agent, or Firm*—Clifford G. Frayne

[57] ABSTRACT

There is disclosed a novel apparatus and process for the complete dewatering of sludge containing hazardous and toxic materials, the stabilization of pathogens and microorganisms contained in the sludge and the disintegration and volume reduction of the resultant solids including a blending chamber for the blending of sludge and a predetermined amount of electrolyte, the partial dewatering of the sludge and electrolyte in a filter unit, the adjustment of the resultant filter cake to a desired thickness and the measurement of the conductivity of the filter cake and the transporting of the filter cake to a disintegration chamber where the filter cake is introduced to an automatically-adjustable source of electrical energy reducing the filter cake to particulate solids and where the filter cake conductivity measurements are communicated to the blending station and the source of electrical energy for the automatic adjustment of same.

14 Claims, 1 Drawing Figure

METHOD AND APPARATUS FOR THE DISINTEGRATION AND DESTRUCTION OF HAZARDOUS AND TOXIC SLUDGE MATERIALS

FIELD OF INVENTION

The method and apparatus claimed herein relates to the dewatering of sludges containing toxic and hazardous materials to approximately 100% solids, sterilizing the pathogens and microorganisms contained therein and disintegrating the remaining solid particles.

BACKGROUND OF THE INVENTION

Municipalities and industries are currently faced with the significant problem of treating solid and liquid waste and further, in treating the solid and liquid waste and disposing of same without any detrimental effects to the surrounding environment. This problem is complicated in that in many industrial processes, certain toxic substances are generated which are found in the sludge together with the normal pathogens and microorganisms which must be neutralized and stabilized. Certain Federal requirements require each industrial point source to identify the outflow of substances from the industrial process and in many instances, depending upon the content of such outflow, the industrial processor is required to take certain steps to remove certain of these substances.

Hazardous and toxic substances contained in the industrial waste pose significant problems in that the industrial processor must provide additional chemical or mechanical processes in order to remove the substances. The remaining sludge is then either treated by a privately-owned treatment plant or is introduced into a public sewerage system. The additional chemical or mechanical processes required of the industrial processor are not always one hundred percent effective in removing the hazardous and toxic materials and they thus find their way into a municipal sewer system. Additionally, the cost to the industrial processor for these additional chemical and mechanical processes is substantial and sometimes prohibitive. Still further, in many instances, there is no chemical or mechanical process to neutralize the hazardous or toxic materials and they are therefore merely filtered from the sludge and stored by the industrial processor or transported to a designated site for storage.

The industry has required for some time, a method and apparatus for the destruction and disintegration of these hazardous and toxic substances such that the aforementioned storage requirements and the possibility of contamination of municipal sewerage systems could be eliminated. The instant method and apparatus provides for the destruction and disintegration of these hazardous and toxic substances while at the same time sterilizing pathogens and microorganisms contained in the sludge such that the resultant end product is an inert granulated solid which in most cases can be disposed of in sanitary landfills without any detriment to the environment. The applicant can accomplish the aforementioned end product by a unique process which provides for a substantially greater degree of dewatering of the sludge coupled with the disintegration of the resultant solids.

OBJECTS OF THE INVENTION

An object of the present invention is to provide a novel continuous method for the substantially complete dewatering of sludge and then sterilizing the pathogens and microorganisms contained therein and disintegrating the resultant solids.

A further object of the present invention is to provide a novel method of the substantially complete dewatering of sludge and the disintegration of certain types of toxic substances contained in the resultant solids.

A still further object of the present invention is to provide a novel continuous method for the substantially complete dewatering of sludge and simultaneously sterilizing pathogens and microorganisms and disintegrating the resultant solids.

A still further object of the present invention is to provide a novel apparatus for sterilization of pathogens and microorganisms in substantially complete dewatered sludge.

A still further object of the present invention is to provide a novel apparatus for the disintegration of certain toxic substances in substantially complete dewatered sludge.

A still further object of the present invention is to provide a novel apparatus which will disintegrate the sterilized dewatered sludge into a granular form.

SUMMARY OF THE INVENTION

These and other objects of the present invention are achieved by a process whereby the sludge is blended with an electrolyte in the blending station with the sludge and electrolyte then being continuously passed to a commercial filter unit for dewatering of the sludge to a predetermined solid minimum, the dewatered sludge and electrolyte then being passed through a rolling mill to compress the dewatered sludge and electrolyte to a predetermined desired thickness as filter cake; the filter cake then passing through a sensing station to determine the amount of electrolyte in the filter cake and its conductivity; the filter cake and electrolyte then enter a chamber whereby the filter cake and electrolyte are subjected to an automatically-adjustable high voltage depending upon the amount of electrolyte in the filter cake and its conductivity causing particulate disintegration of the filter cake, the introduction of inert gas, ozone, or other selected gases into the chamber for the sterilization of pathogens, microorganisms and the oxidation of certain toxic substances and, in particular, heavy metals, the particulate matter then being subjected to a pulverizing mill for the further reduction of the particulate matter to granular form.

BRIEF DESCRIPTION OF THE DRAWINGS

A better understanding of the present invention as well as other objects and advantages thereof, will become apparent upon consideration of the detailed disclosure thereof, especially when taken with the accompanying drawings wherein.

DETAILED DESCRIPTION OF THE DRAWINGS

Figure 1:
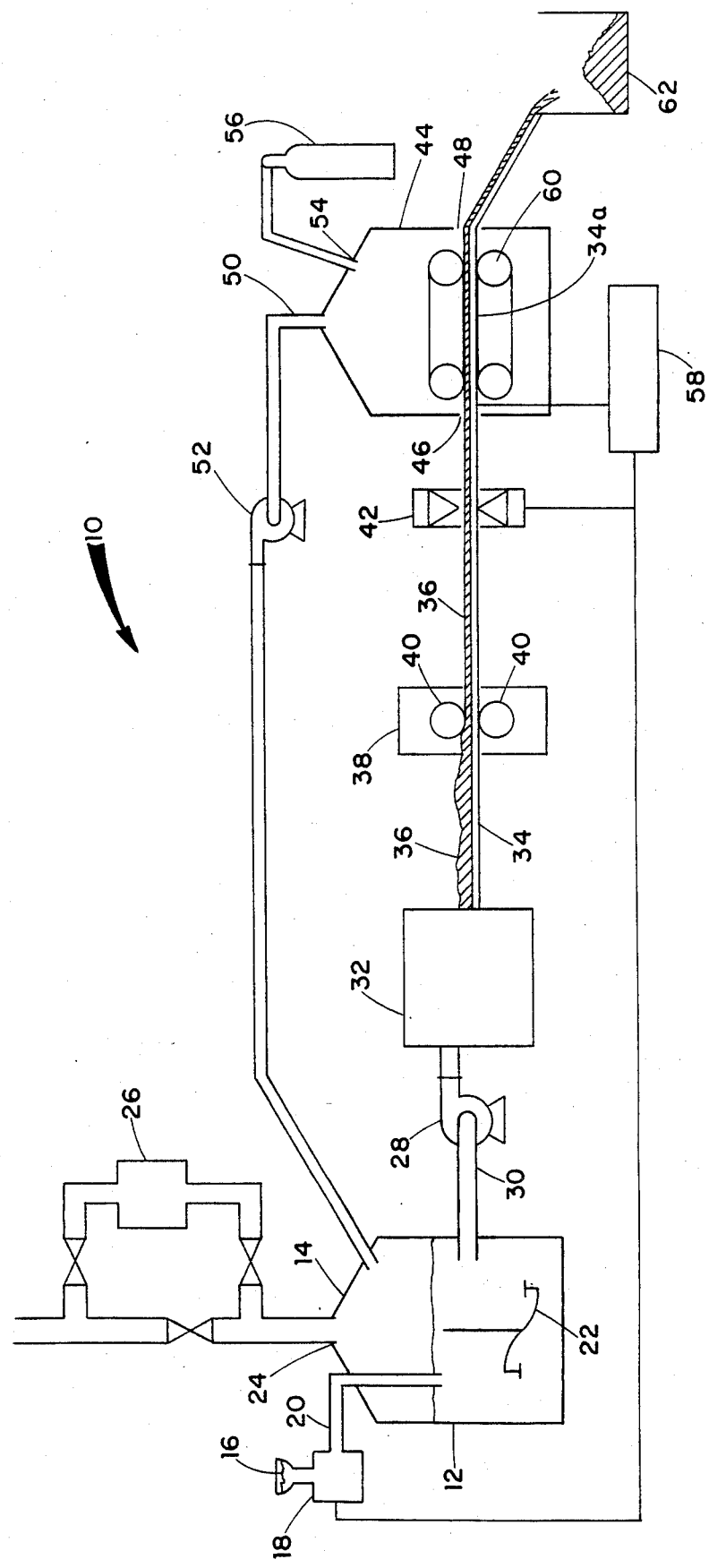
FIG. 1 is a side elevational view of the continuous process for disintegrating dewatered sludge solids.

Referring to FIG. 1, there is shown a side elevational view of the process for dewatering, stabilizing and disintegrating sludge, the overall process referred to generally as 10. The process 10 comprises a first enclosed chamber 12 having an opening 14, for the introduction and storage of sludge. The sludge which has been introduced into chamber 12 has been first tested for conductivity as will be more specifically discussed hereafter. The conductivity of the sludge determines the amount of electrolyte 16 which will be introduced into enclosed chamber 12 by means of feed station 18 and conduit 20 which communicates with enclosed chamber 12. The electrolyte 16 is in the form of conductive polyelectrolytes, the blend of which is determined by the initial conductivity of the sludge, and feedback sensor readings from the process as discussed hereafter in order to impart conductivity to the filter cake. After the introduction of electrolyte into the sludge in the enclosed chamber 12, the sludge and elecrolyte are blended by means of an internal mixer 22, such as a motor driven rotor or other similar mechanical blending or mixing device.

Enclosed chamber 12 also has a vent 24 to prevent the buildup of pressure in enclosed chamber 12, vent 24 communicating with a scrubber 26 to remove any fumes, odors or hazardous gases from the air before venting same to the atmosphere.

The sludge and electrolyte in enclosed chamber 12 are blended until there is an average of 4% solids in the mixture of sludge and electrolyte. The mixture of sludge and electrolyte is then transported by means of pump 28 through a conduit 30 to a filtering unit 32. Filter unit 32 is of a commercial design and may be comprised of a mechanical, vacuum, centrifuge, plate and frame or belt filter which reduces the water content of the sludge. In the desired embodiment, the sludge leaving filter unit 32 would be comprised of a minimum of 10% solids. The sludge is transported from filter unit 32 by means of a conveyor 34. The mixture of sludge and electrolyte which is now dewatered to a minimum of 10% solids, and in the form of a filter cake 36, is transported through a rolling mill 38 which comprises a series of automatically adjustable rollers 40 to adjust the filter cake to a desired uniform thickness. In practice, this thickness would normally be in the range of onehalf inch to one inch.

The filter cake 36, which has now been adjusted to a desired uniform thickness, is next transported by means of conveyor 34 through a sensor station 42. Sensor station 42 comprises electronic sensors to determine the conductivity of the filter cake by means of the conductive polyelectrolyte contained therein, and communicates electronically to the electrolyte feed station 18 to adjust the amount of electrolyte 16 introduced into enclosed blending chamber 12. The filter cake is then passed from sensor station 42 on conveyor 34 into an enclosed disintegrator chamber 44. Disintegrator chamber 44 is an enclosed chamber also in communication with sensor station 42 for input as to the conductivity readings on the filter cake 36.

Disintegrator chamber 44 is an enclosed refractory chamber having an inlet opening 46 for the introduction of filter cake 36 on conveyor 34 into disintegrator chamber 44 and an outlet opening 48 for the outward passage of treated filter cake. Additionally, disintegrator chamber 44 has an outlet conduit 50 coupled with an exhaust fan 52 to remove vapor and hazardous gases that may be generated as a result of the operation, as described hereafter.

Disintegrator chamber 44 has a second inlet opening 54 in communication with a supply of selected gases 56. These selected gases 56 could comprise ozone ($O_3$) or other inert gases for introduction into disintegrator chamber 44 depending upon the composite of the filter cake.

In operation, chamber 44 is enclosed to prevent the escape of gases and materials contained therein. This could be accomplished by exhaust fan 52 in conduit 50 which would return hazardous gases and vapor by means of conduit 50 to blending chamber 22. Further, inlet opening 46 and outlet opening 48 of disintegrator chamber 44 would be designed to minimize the escape of any gases into the ambient atmosphere.

Conveyor bed 34a, contained within the disintegrator chamber 44, is an electrified bed having an external power source 58. The filter cake, in disintegrator chamber 44, is subjected to an electrical charge which is automatically adjustable for variations in the conductivity of the filter cake which includes the conductive polyelectrolytes as communicated from sensor 42. This electrical charge could range to approximately 20,000 volts and generate an arc, flash temperature in the filter cake of approximately 6000° C. In actual operation, the temperature in refractory chamber 44 would be in the range of 1200° C. to 1500° C. The electrical charge to the filter cake causes the evaporation of remaining fluids and liquids contained therein and this vapor, together with other odors and gases given off as a result of the electrical charge to the filter cake, is returned by means of conduit 50 to blending chamber 12.

As a result of the filter cake being subjected to the electrical charge, the temperature of the filter cake increases and the electrical charge precipitates the breakup of the solid material in the filter cake into particulate matter. Also, as a result of the electrical charge to the filter cake, a certain amount of ozone is produced naturally in the disintegrator chamber 44. In addition, provision for the introduction of additional ozone or other gases directly into disintegrator chamber 44 is required due to the conditions of the filter cake is through second inlet 54 in disintegrator chamber 44.

The ozone generated by the electrified charge, together with ozone, directly injected into disintegrator chamber 44 from supply 56 serves to sterilize certain pathogens and microorganisms present in the filter cake. The ozone thus generated also serves to oxidize certain heavy metals which may be contained in the filter cake.

The filter cake, after having been subjected to the electrical charge from conveyor 34a, would be reduced to 100% solid, carbon-like material with a reduction in total solids due to the disintegration of ceratin inert solids as a result of the high temperatures generated. The breakup of this material would already have been precipitated into granular, carbon-like material as a result of the electrical charge, however, a rolling mill or pulverizing mill 60 at the exit to disintegrator chamber 44 would subject the filter cake to a crushing and grinding process which would further reduce the carbon-like material to granular form. These carbon-like granules 48 would then be collected in container 62 for disposal.

In operation, the sludge and electrolyte contained in blending chamber 12 would be approximately 4% solids on average. The filter cake, after having passed through the filter unit 32, would be increased to approximately a minimum of 10% solids. It is this filter cake of approximately 10% solids that would be subjected to the electrical charge in disintegrator chamber 44 which would drive off fluids and vapors and reduce the filter cake to 100% solids.

Applicant's process is designed for both mobile operation and as an in-place plant. Since most industrial processes which generate sludge or other process streams having solids in combination with hazardous and toxic materials are already licensed as a point source, the mobile embodiment of applicant's process would permit on site treatment of the afore-mentioned sludge or process stream. In such a case, the process would operate at approximately 150 gallons per minute. Naturally, the size of the equipment and the contamination of the sludge stream would be parameters to be considered in determining the flow rate.

Applicant's process enables the operator to dewater the sludge or other process stream to a greater degree than previously possible. In doing so, at the high temperatures which are capable with this process, liquids are not only removed from the sludge stream, but a ceratin degree of inert solids are also vaporized so that there is an overall solids reduction in the amount of material to be disposed of at the conclusion of the process. Further, the high temperatures, coupled with the injection of ozone or other gases stabilizes certain heavy metals by oxidizing same in a continuous process. Therefore, not only is there a reduction in the volume of materials which must be disposed, but the materials themselves are in an inert and fully stabilized state.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. A process for the complete dewatering of sludge containing hazardous and toxic materials and stabilization of pathogens, microorganisms and disintegration of the resulting solids and volume reduction of same which comprises:
    (a) measuring the conductivity of said sludge;
    (b) blending said sludge and a predetermined amount of electrolyte in a blending chamber;
    (c) transporting said sludge and electrolyte through a connecting means to a filter unit;
    (d) dewatering said sludge and electrolyte in said filter unit;
    (e) transporting said sludge and electrolyte from said filter unit to a rolling mill;
    (f) rolling said sludge and electrolyte into a filter cake of desired thickness;
    (g) measuring the conductivity of said filter cake;
    (h) transporting said filter cake into a disintegration chamber;
    (i) subjecting said filter cake in said disintegration chamber to an automatically-adjustable source of electrical energy reducing said filter cake to particulate solids;
    (j) pulverizing said particulate solids;
    (k) simultaneously recording the data of step (g) and communicating said data to steps (b) and (i).

2. The process is defined in claim 1 wherein said filter unit comprises a vacuum filter, or mechanical filter, or plate and frame filter, or centrifuge filter, or belt filter.

3. The process is defined in claim 1 wherein said filter cake is in the range of one-half inch to one inch thick.

4. The process is defined in claim 1 wherein said disintegration chamber is contructed of refractory material.

5. The process is defined in claim 1 wherein said automatically adjustable source of electrical energy is introduced to said filter cake by means of an electrified conveyor belt bed.

6. The process as defined in claim 1 wherein the amount of said automatically adjustable source of electrical energy is determined by the conductivity of the filter cake entering the disintegration chamber.

7. The process is defined in claim 1 wherein gases are introduced in step (i) for the stabilization of pathogens and microorganisms and the oxidation of toxic materials.

8. The process is defined in claim 1 wherein hazardous or noxious gases generated in step (i) are continuously recycled to step (b).

9. An apparatus for the complete dewatering of sludge containing hazardous and toxic materials and the stabilization of pathogens and microorganisms and the disintegration of the resulting solids and volume reduction of same which comprises:
    (a) a blending chamber for the blending of said sludge with a predetermined amount of electrolyte, said blending chamber having an inlet means for the introduction of electrolyte and sludge and an outlet means;
    (b) a filter means in communication with said outlet means of said blending chamber for the partial dewatering of said sludge and said electrolyte;
    (c) means for transforming said sludge and said electrolyte into a filter cake and adjusting the thickness of said filter cake;
    (d) sensor means for measuring the conductivity of said filter cake;
    (e) a disintegration chamber having an inlet means for the introduction of said filter cake and an outlet means;
    (f) a transportation means for sequentially transporting said filter cake from said filter means to said outlet means of said disintegration chamber;
    (g) a means for supplying electrical energy of a preselected quantity to said filter cake in said disintegration chamber;
    (h) a means for the introduction of gases into said disintegration chamber; and
    (i) means for communicating said conductivity of said sensor means to said blending chamber and said means for supplying electrical energy.

10. The apparatus as defined in claim 9 wherein said filter means comprises a belt filter or vacuum filter or centrifuge filter or mechanical filter or plate and frame filter.

11. The apparatus as defined in claim 9 wherein said means for transforming said sludge and said electrolyte into a filter cake and adjusting the thickness of said filter cake comprises a rolling mill.

12. The apparatus as defined in claim 9 wherein said disintegration chamber is an enclosed refractory chamber.

13. An apparatus as defined in claim 9 wherein said transportation means for sequentially transporting said filter cake from said filter means to said outlet means of said disintegration chamber comprises a conveyor belt, said conveyor belt being electrically conductive within said disintegration chamber.

14. An apparatus as defined in claim 9 wherein said means for supplying electrical energy of a pre-selected quantity to said filter cake comprises supplying said electrical energy to said electrically conductive conveyor belt.

* * * * *